United States Patent [19]
Delaney et al.

[11] Patent Number: 5,996,086
[45] Date of Patent: Nov. 30, 1999

[54] CONTEXT-BASED FAILOVER ARCHITECTURE FOR REDUNDANT SERVERS

[75] Inventors: William P. Delaney; Gerald J. Fredin; Andrew J. Spry, all of Wichita, Kans.

[73] Assignee: LSI Logic Corporation, Milpitas, Calif.

[21] Appl. No.: 08/949,678

[22] Filed: Oct. 14, 1997

[51] Int. Cl.⁶ .................................................. G06F 15/16
[52] U.S. Cl. ........................ 714/4; 714/3; 714/2; 714/22; 714/6; 709/225
[58] Field of Search ................. 714/22, 2, 3, 4, 714/6; 709/225; 710/15

[56] References Cited

U.S. PATENT DOCUMENTS

| | | | |
|---|---|---|---|
| 4,327,410 | 4/1982 | Patel et al. | 364/200 |
| 4,835,673 | 5/1989 | Rushby et al. | 364/200 |
| 5,117,352 | 5/1992 | Falek | 395/575 |
| 5,134,712 | 7/1992 | Yamamoto | 395/800 |
| 5,327,553 | 7/1994 | Jewett et al. | 395/575 |
| 5,426,774 | 6/1995 | Banerjee et al. | 395/575 |
| 5,513,314 | 4/1996 | Kandasamy et al. | 395/182.04 |
| 5,566,297 | 10/1996 | Devarakonda et al. | 395/182.13 |
| 5,594,863 | 1/1997 | Stiles | 395/182.13 |
| 5,621,884 | 4/1997 | Beshears et al. | 364/282.1 |
| 5,634,052 | 5/1997 | Morris | 714/4 |
| 5,652,833 | 7/1997 | Takizawa et al. | 714/4 |
| 5,675,723 | 10/1997 | Ekrot et al. | 714/17 |
| 5,682,479 | 10/1997 | Newhall et al. | 395/200.72 |
| 5,708,776 | 1/1998 | Kikinis | 714/10 |
| 5,748,873 | 5/1998 | Ohguro et al. | 714/2 |
| 5,787,070 | 7/1998 | Gupta et al. | 714/7 |
| 5,790,775 | 8/1998 | Marks et al. | 714/7 |
| 5,812,751 | 9/1998 | Ekrot et al. | 714/13 |

*Primary Examiner*—Ly V. Hua
*Assistant Examiner*—Wasseem Hamdan

[57] ABSTRACT

In a redundant server network system, failover services for a failed server are provided by a survivor server belonging to a common failover group. At startup of a local server process running on the survivor server, a context is created for the local server and for each remote server belonging to the same failover group as the local server. At startup the context of the local server is also activated. The local server process is configured to operate on and make decisions based upon activated contexts. Each context includes server specific configuration and control information. When the survivor server must provide failover services for a failed server belonging to its same failover group, the context corresponding to the failed remote server is activated.

15 Claims, 5 Drawing Sheets

IDENTIFICATION INFORMATION

| SERVER_ID |
|---|
| CONFIG_LOCATION |
| INITIALIZED_?_FLAG |
| #CONTEXTS |
| BOOTDISK |

*FIG. 4*

CONFIGURATION INFORMATION BLOCK

| CLIENTS_INFO |
|---|
| USERS_INFO |
| BACKUP_INFO |
| ERROR_LOG_ILOCATION |

*FIG. 5*

CONTEXT RECORD

| CONTEXT_ID |
|---|
| OP_MODE |

CONTEXT-BASED FAILOVER ARCHITECTURE FOR REDUNDANT SERVERS

FIELD OF THE INVENTION

The present invention relates generally to the field of network systems, and more particularly to a system and method for efficiently providing failover support services in a redundant server environment.

BACKGROUND OF THE INVENTION

The advent of networked computer systems, hereinafter termed network systems, has made possible advances in the capabilities of information processing and software engineering. Network systems are widely used in business, industry and engineering as a valuable tool for retrieving, storing, and handling information.

As known by those familiar with network systems, a network system includes two or more network processing nodes (e.g., a computer system or a stand-alone storage device), each under the control of an independent operating system and joined together by a communication network. One of the main advantages of a network system is its ability to allow network processing nodes to share files. Access to shared files is coordinated by a set of protocols implemented in the operating system of each network processing node that is configured to share the file. A network processing node that provides access for other network processing nodes in the network system to a shared file is known as a file-server, hereinafter termed "server", and is said to "serve" the shared file. A server executes a "server process" that provides network and shared file access services. A network processing node that requires access to a shared file that is served by another network processing node is known as, and is termed herein, a "client".

Network systems may have more than one server if different network processing nodes in the network system independently provide access to different shared files. Accordingly, any network processing node in a network system may act concurrently as both a server and a client if it both serves a shared file and also requires access to a different shared file served by a different server.

As just described, clients rely on servers to access shared files. Accordingly, if a server fails for any reason, the shared files that the failed server serves will generally be inaccessible to its clients unless a method for providing the functionality of the failed server is in place. Network access services which provide the functionality of failed servers are known in the art as failover services. In present day network systems, failover services are created manually by system administrators and are based on explicit failover configuration information that is typically stored in configuration files on local storage of each server. The configuration information specifies the actions to be performed by a surviving server assigned to the same failover group, hereinafter termed "survivor", when another server belonging to the same failover group fails. The services provided by these failover services, such as file and print serving, are generally identical to services provided by the survivor for its normal service environment. However, the processes are instantiated differently for failover services than for the survivor's normal environment because the failed server's authorized clients and exported resources are different than those of the survivor. Consequently, for any given potential survivor, a special "failover" version of the survivor's server process software must be created for each other server belonging to the same failover group. Each of these special "failover" versions may be started up and executed concurrently with the survivor's normal server process by the survivor when the server it was created to perform failover services for fails. The present day approach to providing failover services in a redundant server environment requires a significant amount of memory space where duplicated code resides. In addition, it involves significant software complexity associated with creating special versions of server process software and in initiating new server processes on the survivor as specified by failover configuration files.

Accordingly, a need exists for an improved method for providing failover services for failed servers in a redundant server network system.

SUMMARY OF THE INVENTION

The present invention provides such an improved method for providing failover services for a failed server in a redundant server network system in such a way as to require little or no intervention by the network system administrator and minimal additional software development effort or expense. According to the invention, when a failed server belonging to the same failover group as a survivor server is detected, the survivor server acquires the storage device of the failed server on which the failed server's configuration information is stored. The survivor server activates a failover context for the failed server which includes the failed server's configuration information. The survivor server process is context-aware in that it is implemented to operate on and make decisions based upon multiple contexts. In a preferred embodiment the survivor server process is implemented with a plurality of threads, each of which may be either context-aware, context-specific, or context-dumb. When a failover context is activated, any context-aware threads which get started up by the server process operate on the failover context as well as the survivor server's local context. By acquiring a failed server's storage device, reading its configuration information, creating a failover context based on that configuration information, activating the failover context, and executing a server process that operates on active contexts, the invention simplifies the provision of failover services by removing the necessity of system administrator intervention and by eliminating the need to create special versions of software for processes which make decisions based on different configuration information.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

This invention presumes familiarity with basic network system terminology, including certain well-known operating system terminologies. However, in order to facilitate an understanding of the present invention, a glossary of terms specific to the present invention is included herein below.

Glossary

Failover Group—A group of servers, each of which may provide failover services for any other if it fails.

Local Server—The server executing a local server process. The local server is always the physical network processing node executing the local server process.

Remote Server—A different physical network processing node on which an independent server process is executing. A remote server is always a network processing node communicating with the local server over the communications network.

Server ID—A unique integer identifying each server assigned to the same failover group in the network system. The server ID defines inter-network processing node addresses and precedence of control information between network processing nodes during system initialization.

Context—The union of all server specific control and configuration data and files. The context for each server is identified by an integer ID.

Local Context—The context of the local server.

Remote Context—The context of a remote server.

Figure 1:
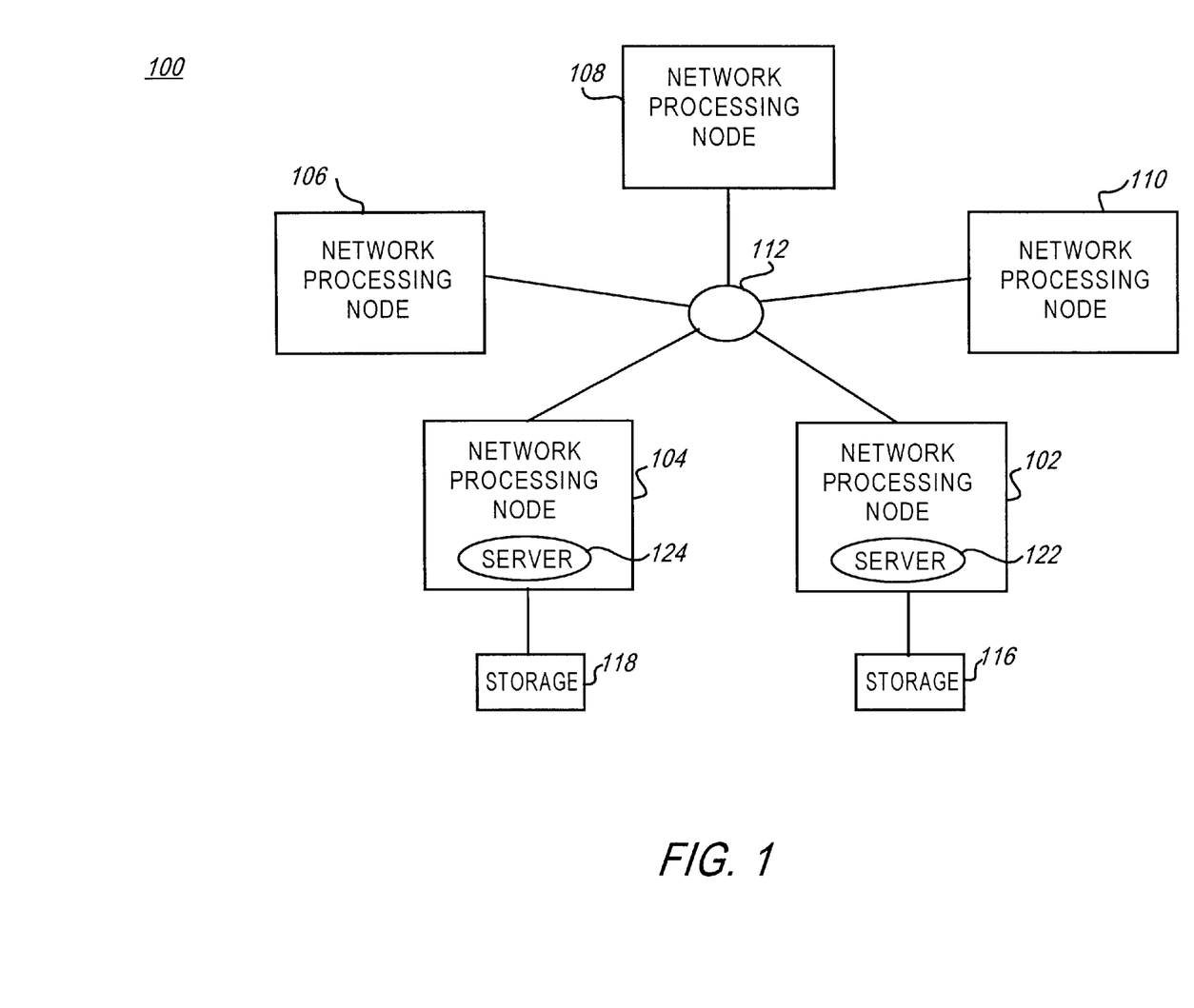
FIG. 1 is a block diagram of a redundant server network system.

FIG. 1 is a block diagram of a redundant server network system. The network system, shown generally at 100, includes a plurality of network processing nodes 102–110 interconnected by a communications network 112. Communications network 112 may be implemented using any conventional implementation (e.g., an Ethernet, which is well-known in the art). Network processing nodes 102–110 communicate with one another using a communications protocol, such as Network File Server (NFS) manufactured by Sun Microsystems, which runs either on UDP/IP or TCP/IP.

At least two of network processing nodes 102–110 operate as servers. In FIG. 1, network processing nodes 102 and 104 operate as servers and any or all of network processing nodes 102–110 operate as clients. As is to be understood, either or both of network processing nodes 102 and 104 may operate as both server and client, but will be hereinafter referred to as server 102 and server 104. Server 102 serves shared files located on a first storage device 116 for all of its clients in the network system 100, and network processing node 104 serves shared files located on a second storage device 118 for all of its clients in the network system 100. Accordingly, all access requests to shared files located on storage device 116 are served by a server process 122 executing on server 102, and all access requests to shared files on storage device 118 are serviced by a server process 124 executing on server 104. If either server 102 or 104 fails, the survivor server provides failover services for the failed server, which include serving the shared files normally served by the failed server.

Figure 2:
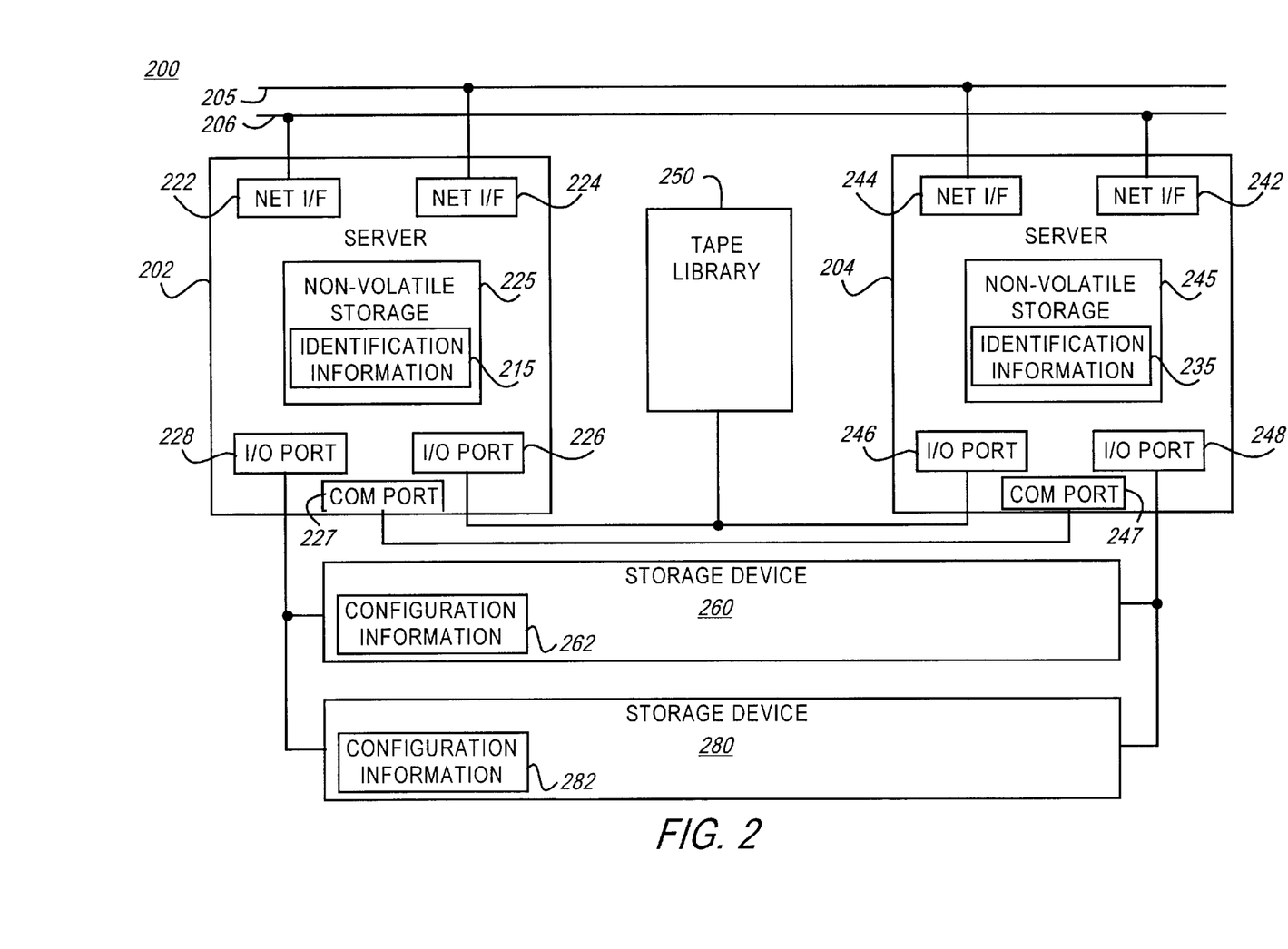
FIG. 2 is a block diagram of a portion of a redundant server network system with full path redundancy.

FIG. 2 is a portion of a redundant server network system 200 with full path redundancy included herein to illustrate the principles and operation of the invention. As shown in FIG. 2, the network system 200 includes a pair of redundant servers, shown respectively at 202 and 204. Each server 202, 204, includes respective network interfaces 224, 244 which are both coupled to a first communications network 205, and respective second network interfaces 222, 242 both coupled to a second communications network 206. Additional communication ports, shown respectively at 227 and 247, may be provided in each respective server 202 and 204 to provide a dedicated communication link between servers 202 and 204 for exchanging failover and system synchronization messages. Additionally, each server 202, 204 includes a respective I/O port 228, 248 which is coupled to both a first storage device 260 and a second storage device 280. The embodiment of FIG. 2 shows two storage devices 260, 280 for convenience of illustration of the invention. However, those skilled in the art will appreciate that additional storage devices may be supported. Typically, one server will operate as a primary server for files located on a given storage device. A primary server is said to "own" the storage device it serves. If a primary server fails, however, the redundant server, or "secondary" server, may operate to serve the shared files located on the storage device owned by the primary server. Thus, each server 202, 204 has access to data stored on either or both in FIG. 2, servers 202, 204 may also include an I/O port 226, 246 such as a SCSI port in order to access an external storage device 250 such as a tape library. Since full path redundancy exists between servers 202 and 204, if one server fails, the survivor server will have the ability to access the disks owned by the failed server and accordingly serve the shared files owned by the failed server. Each server 202, 204 also respectively includes non-volatile storage 225, 245, such as an electronically erasable read only memory (EEPROM) or a battery powered random access memory (RAM).

In the present invention, the non-volatile storage 225, 245 of each server 202, 204 is respectively used to store identification information 215 and 235, specific to its local server (i.e., the physical server ID, number of servers in the failover group, and location of where the server's configuration information resides). The identification information of each server, shown respectively at 215 and 235, identifies the location of its respective server's configuration information, 262 and 282, which is preferably stored on respective storage devices 260 and 280. In the preferred embodiment, configuration information 260, 280 is stored as a structure of server-specific environment variables and configuration files. These environment variables and files include data information necessary to boot up the server and execute thereafter. For example, typical environment variables might include the server's network node address, I/O port addresses and IDs, and backup states and schedules, and typical configuration files might include currently mounted clients, security information, user access information, user groups, and error logs. The configuration information 262, 282 may be operated upon or used by the server process to make decisions. Accordingly, the configuration information 262, 282 is essential not only to a local server process running on a given server, but also to any process that provides failover services for the server if it fails.

Accordingly, the present invention implements a context-based failover architecture in which a server process may operate on or make decisions differently depending on the context that it is currently in. At bootup of a server, space is allocated for a local context of the server itself and for a remote context for each other server belonging to the local server's same failover group. Preferably at the end of the bootup process, the local context is fully initialized and activated. Each remote context may be fully or partially initialized during the bootup process, but under normal operation is not activated. After the bootup process is complete, the local server process cycles through each active context. Under normal operation typically only the local context will be active. Occasionally, however, the local server may be required to provide failover services for a remote server in its same failover group. If this occurs, the local server (i.e., the survivor server) acquires the storage device containing the configuration information of the remote (i.e., failed) server, completes any additional initialization of the remote context allocated by the local server for the failed server, and activates the remote context. The local server process executes, cycling through each active context, which now includes the remote context of the failed server. Accordingly, the local server provides failover services for the remote server.

As just described, the present invention implements a server process which cycles through a number of active contexts and may operate on or make decisions based upon the configuration information associated with each context differently.

It will be appreciated by those skilled in the art that server processes are typically implemented as a plurality of threads. Each thread typically performs a particular function and has a lifetime only long enough to execute and complete its particular function. Those skilled in the art will also appreciate that not every function performed by a server process thread requires the use of configuration information to perform its particular function. In fact, server process threads may be categorized generally into three different groups—namely, "context-aware", "context-specific", and "context-dumb" threads.

A context-aware thread is a thread that operates on multiple contexts during its lifetime. A context-aware thread makes explicit decisions about the context upon which it is operating.

A context-specific thread is a thread that operates on one and only one context throughout its entire lifetime. Multiple instances of a given context-specific thread may be created, one for each active context.

A context dumb thread is a thread that is not aware of communication module contexts. It may or may not operate on context specific data. It may or may not operate on multiple threads throughout its lifetime. The existence of multiple contexts is transparent to the thread, and any and all changes of context that occur during the thread's operation are done without the knowledge, awareness, or explicit intervention of the thread. If it does operate on context specific data or on multiple contexts, that operation is done outside the normal processing.

In the preferred embodiment implementation of the server process, each thread is implemented as either a context-aware, context-specific, or context-dumb thread according to the functionality of the thread and according to performance versus space requirement (i.e., optimization) considerations.

If a remote server fails, a local survivor server accesses the configuration information stored in the remote failed server's storage device. As described in more detail hereinafter, the survivor server utilizes the configuration information of the remote failed server to activate the failed server's context. As described in the glossary of terms, a context includes the communications-module-specific control and configuration data and files. The survivor server activates a failover context for the failed server and starts any required context-specific processes for the failed server, as discussed hereinafter.

Figure 3:
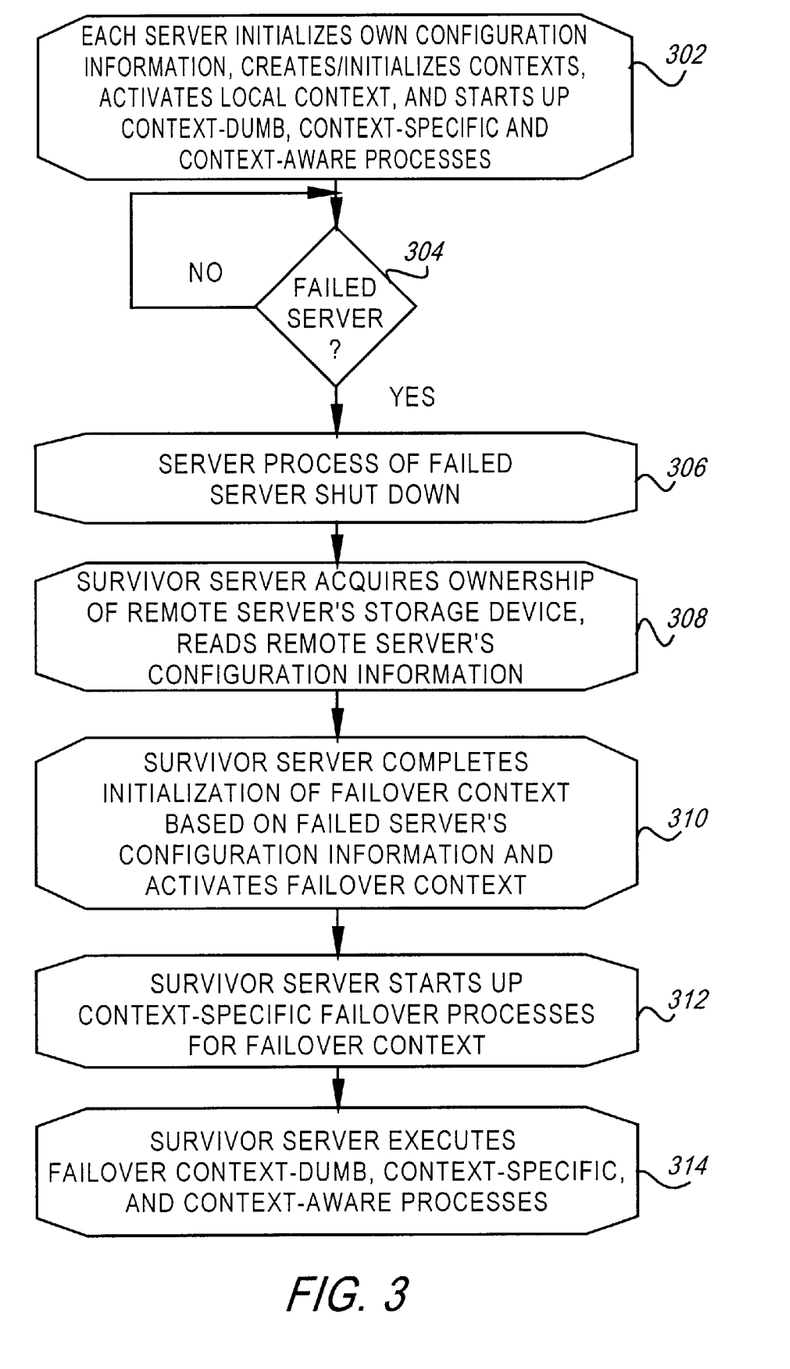
FIG. 3 is a flowchart illustrating the method of operation of the invention.

FIG. 3 is a flowchart illustrating the method of operation of the invention. As shown in FIG. 3, the method, shown at 300, includes a step 302 where each server belonging to the same failover group initializes its respective configuration information, creates its local context and remote contexts for each remote server that is a member of the same failover group, activates its local context, and starts up all context-dumb and context-aware processes, and any context-specific processes.

In a step 304 a health monitor process running on each server in the same failover group monitors the status of the servers to determine if any server has failed. This may occur in one or more ways. For example, the respective health monitor process may detect a failure in its local server. If this is the case, the health monitor process may send a message indicating that its local server has failed to a remote health monitor process running on a remote survivor server. In the alternative, a local survivor server may determine that a remote server has failed without receiving a specific message from the failed server. This may occur, for example, if a catastrophic failure of the remote server has occurred. A catastrophic failure may occur for a variety of reasons, including a network interface failure, a disk I/O path failure, a server process crash, or any other type of hardware failure.

Once a survivor server becomes aware of the status of the failed server, the server process on the failed server is shut down in a step 306 if it has not already shut down.

In step 308, the survivor server acquires ownership of the failed server's storage device and reads the remote server's configuration information.

In step 310, the survivor server completes any necessary context initialization based on the failed server's configuration information for the failed server's context as seen by the survivor server (hereinafter termed "failover context"), and then activates the failover context.

In step 312, the survivor server then starts up any context specific failover processes for the failover context.

Finally, in step 314, the survivor server executes the failover context-dumb, context-specific, and context-aware processes until the failed server is restored to a normal operative state.

Figure 4:
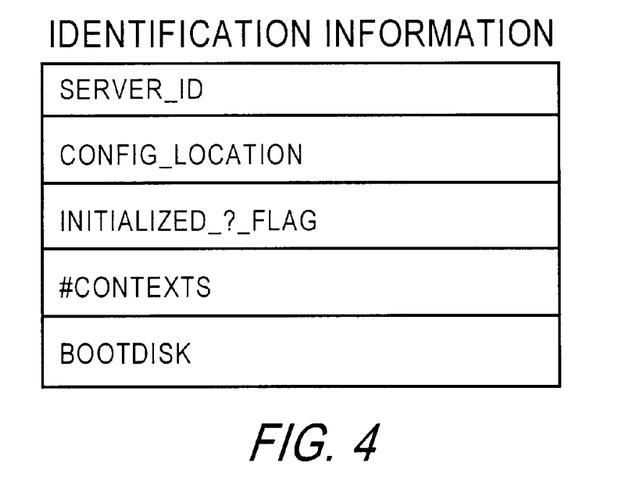
FIG. 4 is an example implementation of the type of identification information that may be stored in the non-volatile storage of each redundant server in a redundant server network system.

FIG. 4 is an example implementation of the identification information 215 and 235 that is stored in the non-volatile storage 225 and 245 of each respective server 202 and 204 in the redundant server network system of FIG. 2. As shown, the identification information 215, 235 each preferably includes a server identifier SERVER_ID that is unique across the failover group. The identification information also preferably includes a variable CONFIG_LOCATION which indicates where the configuration information is stored. The configuration information may be stored on a disk local to the server or may be distributed across several storage devices located throughout the network system. In a preferred embodiment, each server 202, 204 owns a different one of the storage devices 260, 280, and respective configuration information files 262 and 282 are stored beginning at the same locations on each respective storage devices 260 and 280. In a redundant server network system each server in the same failover group has the ability to acquire control of the storage device or devices on which the configuration information for each other server is stored. As shown in FIG. 4, the identification information block also preferably includes a flag INIT which indicates whether the identification information block has been initialized. The INIT flag is important for indicating whether or not the configuration information of a failed server is valid. The identification information block may also include a variable #CONTEXTS which indicates the number of contexts currently in use by the server (i.e., the number of servers in the failover group). Another variable, BOOTDISK, may also be included in the identification information block to indicate where the local server is to be booted from.

Figure 5:
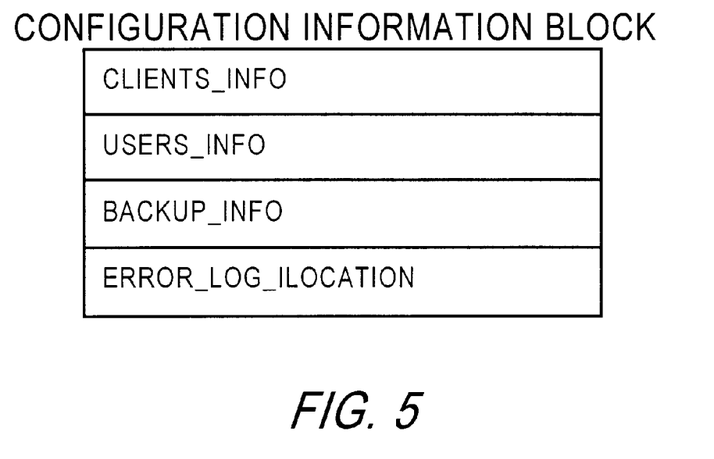
FIG. 5 is an example implementation of the type of information that may be included as configuration information for each redundant server in a redundant server network system.

FIG. 5 is an example configuration information block that contains the configuration information necessary to start up a failover server process if the local server fails. As shown in FIG. 5, the configuration information block preferably includes a list of client records, CLIENT_INFO, which includes a client record for each mounted client of the server. Preferably, each client record includes the network node addresses, communications ports ID's, and other necessary information. Another variable, USER_INFO, may provide a list of authorized user records, each containing the user ID, corresponding passwords, and user configurations. Another variable, BACKUP_INFO, may be included to provide necessary backup state information and schedules for the local server. An error log location variable, ERROR_LOG_LOCATION, may also be stored in the configuration information block. The ERROR_LOG_LOCATION preferably contains a pointer to an error log generated by the local server, which may be helpful in troubleshooting local server and overall network system problems. As will be appreciated by those skilled in the art, the scope and type of configuration information may vary from system to system and is included herein by way of example only and not limitation.

Figure 6:
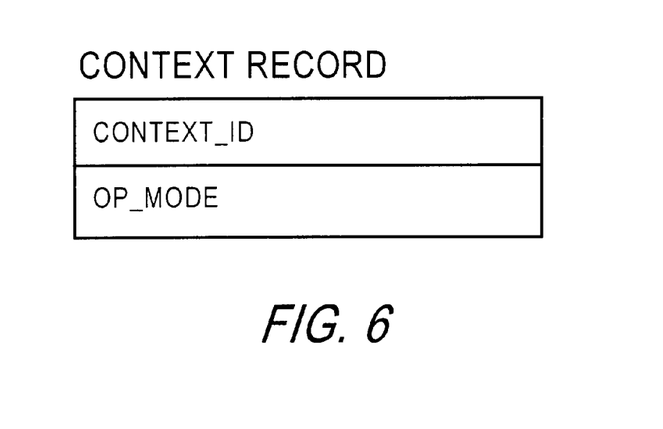
FIG. 6 is an example implementation of the type of information that may be included as part of a context record in the invention.

FIG. 6 illustrates an example of the type of information included in a single context record that is allocated, created and initialized during bootup. As shown in FIG. 6, a context record preferably includes a context identifier CONTEXT_ID for identifying a specific server's context in any data structure containing multiple elements for server specific state or data. The context identifier CONTEXT_ID is not equivalent to the server identifier SERVER_ID. The server identifier SERVER_ID is fixed and unique across the network system. Context identifiers are determined when the server is booted and are only unique within a single server.

In a preferred embodiment, the context record includes a variable OP_MODE which indicates the operational state and execution location of its associated server process. In the embodiment shown in FIG. 6, operational state variable OP_MODE may take on one of the following values: FO_MODE_START, FO_MODE_UNKNOWN, FO_MODE_NORMAL, FO_MODE_FAILED, FO_MODE_FAIL_OVER, and FO_MODE_STOP. An operational state OP_MODE value of FO_MODE_START indicates that the local or remote server is starting up, typically at bootup. An operational state OP_MODE value of FO_MODE_UNKNOWN indicates that the operational state of the remote server is unknown (i.e., communication could not be established with the remote server). An operational state OP_MODE value of FO_MODE_NORMAL indicates that the local or remote server is operating normally. An operational state value of FO_MODE_FAILED indicates that the remote server has failed and its network services are being provided by another remote server. An operational state value of FO_MODE_FAIL_OVER indicates that the remote server has failed and its network services are being provided by the local server. An operational state value of FO_MODE_STOP indicates that the local server is shutting down normally or going off-line due to a hardware failure.

Figure 7:
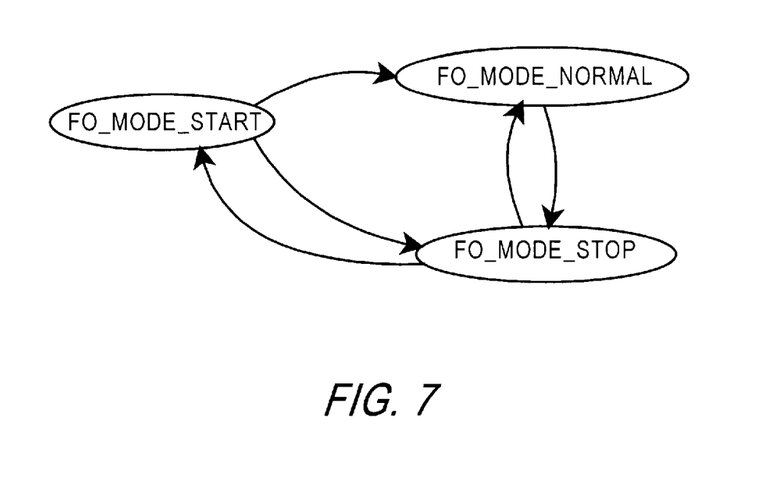
FIG. 7 is a state diagram of one embodiment of the invention of the possible operational state transitions of a local server.

The valid operational state values and transitions differ for local and remote contexts. FIG. 7 illustrates a state diagram of the operational state transitions for a local server (i.e., the local server associated with the context). As shown, a local server may assume fail-over operational state values of FO_MODE_START, FO_MODE_NORMAL, and FO_MODE_STOP. The operational state transitions and transition conditions for each state are presented below in tabular format.

| Local Context Transitions | |
|---|---|
| New Local Context Mode: | On Condition: |
| From FO_MODE_START Mode: | |
| FO_MODE_NORMAL | When local server is providing its own file services. |
| FO_MODE_STOP | When the local server is shutting down or has failed. |
| From FO_MODE_NORMAL Mode: | |
| FO_MODE_STOP | When the local server is shutting down or has failed. When the remote server sends a reboot or halt message to the local server indicating it is ending normal operations. |
| From FO_MODE_STOP Mode: | |
| FO_NODE_START | When the local server is reset or rebooted. |
| FO_MODE_NORMAL | When the local server receives a synchronization message from a remote server that has completed a reboot at the completion of a reboot, halt, or resume operation. |

The transition between the FO_MODE_NORMAL FO_MODE_STOP are initiated by reboot, halt, and synchronization messages. All other transitions to the FO_MODE_STOP state are the result of conditions on the local server such as a detected failure or an operator requested reboot or halt. The transition between the FO_MODE_STOP and FO_MODE_START is the implicit transition that occurs on system startup. All transitions from the FO_MODE_START are predicated on the state of the local and remote servers at the time of system startup.

Figure 8:
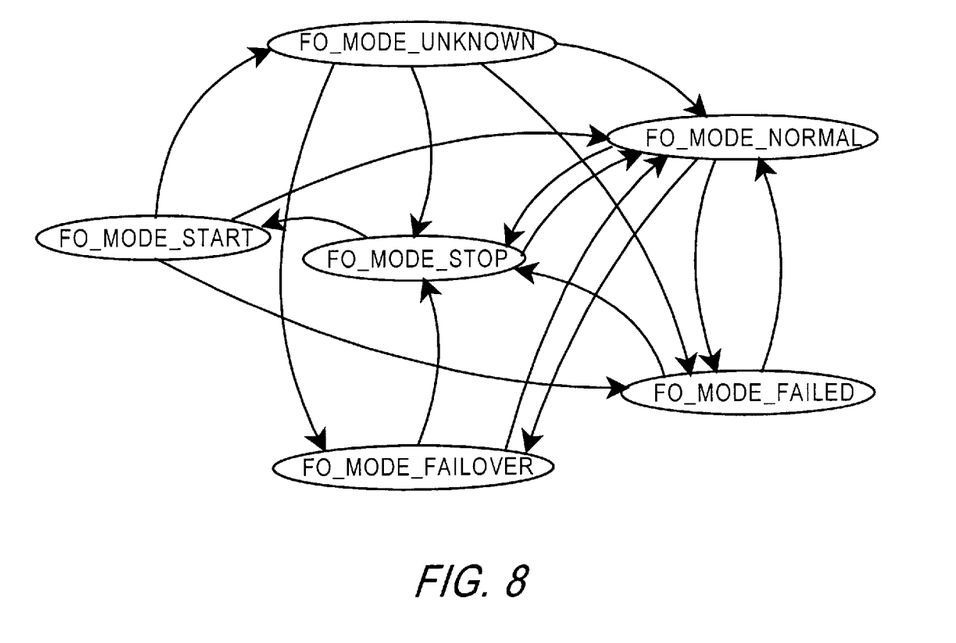
FIG. 8 is a state diagram of one embodiment of the invention of the possible operational state transitions of a remote server.

FIG. 8 illustrates a state diagram of the operational state transitions for a remote server (i.e., a remote server associated with the context). As shown, a remote context may assume operational state OP_MODE values of FO_MODE_START, FO_MODE_UNKNOWN, FO_MODE_NORMAL, FO_MODE_FAILED, FO_MODE_FAIL_OVER, and FO_MODE_STOP. The operational state transitions and transition conditions for each state are presented below in tabular format.

| Remote Context Transitions | |
|---|---|
| New Remote Context Mode: | On Conditions: |
| From FO_MODE_START Mode: | |
| FO_MODE_NORMAL | When remote server is providing its own file services. |
| FO_MODE_FAILED | When another remote server is providing fail-over services for the failed remote server. |
| FO_MODE_FAILOVER | When the local server is providing fail-over services for the failed remote server. |
| FO_MODE_UNKNOWN | When the local and remote server are unable to establish communications. |
| From FO_MODE_NORMAL Mode: | |
| FO_MODE_FAILED | When another remote server initiates fail-over services for a failing remote server. |
| FO_MODE_FAILOVER | When the local server initiates fail-over services for a failing remote server. |
| FO_MODE_STOP | When the local server is shutting down or has failed. When the remote server sends a reboot or halt message to the local server indicating it is ending normal operations. |
| From FO_MODE_FAILED Mode: | |
| FO_MODE_NORMAL | When another remote server terminates fail-over services for a repaired remote server. |
| FO_MODE_STOP | When the local server is shutting down or has failed. |
| From FO_MODE_FAILOVER Mode: | |
| FO_MODE_NORMAL | When the local server terminates fail-over services for a repaired remote server. |
| FO_MODE_STOP | When the local server is shutting down or has failed. |
| From FO_MODE_UNKNOWN Mode: | |
| FO_MODE_NORMAL | When the local and remote server establish communications. |
| FO_MODE_FAILED | When another remote server initiates fail-over services for a failing remote server. |
| FO_MODE_FAILOVER | When the local server initiates fail-over services for a failing remote server. |
| FO_MODE_STOP | When the local server is shutting down or has failed. |
| From FO_MODE_STOP Mode: | |
| FO_MODE_START | When the local server is reset or rebooted. |
| FO_MODE_NORMAL | When the local server receives a synchronization message from a remote server that has completed a reboot at the completion of a reboot, halt, or resume operation. |

The transitions between the FO_MODE_NORMAL, FO_MODE_FAILED, FO_MODE_FAILOVER, and FO_MODE_UNKNOWN states are initiated upon the receipt of failed, fail-over, and resume messages. The transition between the FO_MODE_NORMAL FO_MODE_STOP are initiated by reboot, halt, and synchronization messages. All other transitions to the FO_MODE_STOP state are the result of conditions on the local server such as a detected failure or an operator requested reboot or halt. The transition between the FO_MODE_STOP and FO_MODE_START is the implicit transition that occurs on system startup. All transitions from the FO_MODE_START are predicated on the state of the local and remote servers at the time of system startup. In the current embodiment, only the transition between FO_MODE_UNKNOWN and FO_MODE_FAILOVER is implemented. A simplification for a two server environment eliminates the FO_MODE_FAILED state.

It will be appreciated from the above discussion that one distinct advantage of the method of the present invention is its ability to provide failover services in a redundant server network system by modifying only a minimal amount of existing server code. As described previously, a server process is typically implemented with a plurality of threads that each perform particular functions. In a typical server process, a vast majority of server threads perform functions that do not require knowledge of, or awareness of, different contexts of the server. Accordingly, these types of threads are preferably implemented as context-dumb threads which generally require no code modification at all. An illustrative example of threads that may be implemented as context-dumb are all of the NFS file serving processes performed at the network layer by Sun Microsystem's commonly used Network File Server (NFS) communications protocol. In this system, I/O requests are received at the transport layer, which is implemented using either a transport control protocol (TCP/IP) or a user datagram protocol (UDP/IP). An identifier for the I/O request is set at this layer, based on the requesting client and requested server, at the time the request is received. The I/O request identifier indicates which context the server process must be in to perform the request. The I/O request and associated identifier are handed off to NFS threads executing at the network layer which perform the data access functions. Each NFS thread performs its particular data access function using the I/O request identifier without being aware of the context that the server processor must operate in to perform the I/O request. Because the NFS file server threads are unaware of contexts, they are preferably implemented as context-dumb processes and thus the existing NFS code may remain unchanged.

Context-aware implementation is only required for threads that access resources with specific usage constraints. An illustrative example of such a thread is a thread that maps ports in a system that implements the transport layer using a UDP/IP communications protocol. As known by those skilled in the art, an attempt to bind more than one process to a single UDP port is illegal under UDP/IP. Accordingly, this thread is required to be context-aware.

Some types of functions require a thread to have knowledge of the context the server process is operating in. These functions may be implemented as either context-aware or context-specific threads. The decision on whether or not to modify the implementation of a particular thread is a tradeoff between performance and memory utilization. Accordingly, when performance is critical, a thread that utilizes configuration information may be implemented as a context-specific or context-dumb thread rather than a context-aware thread. Illustrative examples of context-specific threads may be a failover thread that activates a failover context for a remote failed server, initialization threads that are executed at bootup, and backup scheduling processes for systems in which different servers share a common backup storage device and thus require the different servers to communicate with each other to negotiate scheduling conflicts.

From the above discussion, it is clear that to afford as little modification to existing server process code as possible, most threads are preferably implemented as either context-dumb or context-specific threads.

As will be appreciated from the description of the invention presented herein, an improved method for providing failover services in a redundant server network system may be achieved using a context-based failover architecture. While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. In a redundant server network system comprising a local server and a remote server belonging to a common failover group, a method for providing failover services for said remote server if said remote server fails, said method comprising the steps of:

creating and initializing a local server context based on local server configuration information associated with said local server that is stored on a first storage device;

activating said local server context;

becoming aware of a failure of said remote server;

acquiring a second storage device;

reading remote server configuration information associated with said remote server that is stored on said second storage device;

creating and initializing a failover context based on said remote server configuration information read from said second storage device;

activating said failover context; and executing a server process on said local server which operates on, and makes decisions based upon, activated ones of said local server context and said failover context.

2. The method of claim 1, wherein:

said server process comprises a context-aware process configured to switch between each of said activated ones of said local server context and said failover context.

3. The method of claim 1, further comprising the step of:

starting up a failover context-specific process for said failover context on said survivor server when said failover context is activated, said failover context-specific process configured to operate on said failover context.

4. The method of claim 1, wherein:

said server process comprises a context-dumb process configured to be unaware of said plurality of contexts.

5. The method of claim 1, comprising the step of:

reading from a non-volatile storage device a location in said second storage device from which to read said failed server specific configuration information.

6. A network system for providing failover services for redundant servers, comprising:

a remote server coupled to a first storage device which stores remote server specific configuration information associated with said remote server;

a local server coupled to a first storage device which stores local server specific configuration information associated with said local server, said local server having ability to acquire said first storage device and to read said remote server configuration information;

a local server process comprising:

an initialization process for creating a local context based on said local server configuration information and a remote context based on said remote server configuration information, and for activating said local server context; and a failover process for acquiring said first storage device, reading said remote server specific configuration information, creating and initializing a failover context, and activating said failover context when said local server is to provide failover services for said remote server;

said local server process executing on said local server by operating on, and making decisions based upon, activated ones of said local server context and said failover context activated ones of said local context and said remote context.

7. The system of claim 6, comprising:

a non-volatile storage device comprising a first variable which indicates a location of said remote server specific configuration information on said first storage device.

8. The system of claim 7, wherein:

said non-volatile storage device comprises a second variable which indicates a location of said local server specific configuration information on said second storage device.

9. The system of claim 6, wherein:

said remote server serves shared files on said first storage device; and said failover process is configured to cause said shared files to be served by said local server.

10. The system of claim 9, wherein:

said failover process starts up a failover context-specific process for said remote context on said local server, said failover context-specific process configured to operate on said remote context.

11. The system of claim 6, wherein:

said server process comprises a context-dumb process, said failover context-dumb process being configured to be unaware of said local context or said remote context.

12. A server process for providing failover services in a redundant server network system, said network system comprising a local server and a remote server belonging to a common failover group, said local server coupled to a first storage device which stores local server specific configuration information and said remote server coupled to a second storate device which stores remote server specific configuration information, said server process executing locally on said local server, said server process comprising:

an initialization process for creating a a local server context based on said local server specific configuration information stored on said first storage device, and for activating said local server context; and a failover process for acquiring said second storage device, reading said remote server specific configuration information from said second storage device, creating and initializing a failover context based on said remote server specific configuration information, and activating said failover context when said local server is to provide failover services for said remote server; and and execution process which cycles through, operates on, and makes decisions based upon, activated ones of said local server context and said failover context.

13. The server process of claim 12, wherein:

said failover process starts up a failover context-specific process for said remote context on said local server, said failover context-specific process configured to operate on said failover context.

14. The system of claim 13, further comprising:

a context-dumb process configured to be unaware of said local context and said failover context.

15. The server process of claim 12, further comprising:

a context-dumb process configured to be unaware of said local context and said failover context.

* * * * *